US008743667B1

(12) United States Patent
Brockie et al.

(10) Patent No.: US 8,743,667 B1
(45) Date of Patent: Jun. 3, 2014

(54) METHOD FOR CONTROLLING WRITING IN A THERMALLY-ASSISTED RECORDING (TAR) DISK DRIVE WITH THERMAL FLY-HEIGHT CONTROL

(71) Applicant: HGST Netherlands B.V., Amsterdam (NL)

(72) Inventors: Richard Michael Brockie, Los Gatos, CA (US); Gregory John Parker, San Jose, CA (US); Hans Juergen Richter, Palo Alto, CA (US); Erhard Schreck, San Jose, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/777,778

(22) Filed: Feb. 26, 2013

(51) Int. Cl.
*G11B 11/00* (2006.01)
(52) U.S. Cl.
USPC .................................................. 369/13.33
(58) Field of Classification Search
USPC ........... 369/13.01, 13.02, 13.11, 13.23, 13.33
See application file for complete search history.

(56) References Cited

U.S. PATENT DOCUMENTS

| 6,867,940 | B2  |   | 3/2005  | Pleiss                     |
|-----------|-----|---|---------|----------------------------|
| 7,099,097 | B2  | * | 8/2006  | Hamaguchi et al. ... 360/59 |
| 7,375,914 | B1  | * | 5/2008  | Dieron et al. ......... 360/75 |
| 7,423,832 | B2  |   | 9/2008  | Buch                       |
| 7,457,072 | B2  |   | 11/2008 | Dieron et al.              |
| 7,990,647 | B2  | * | 8/2011  | Lille ................... 360/59 |
| 8,325,569 | B1  | * | 12/2012 | Shi et al. ............. 369/13.33 |
| 8,406,090 | B2  | * | 3/2013  | Juang et al. .......... 369/13.03 |
| 8,441,909 | B1  | * | 5/2013  | Thayamballi et al. ... 369/116 |
| 8,456,980 | B1  | * | 6/2013  | Thayamballi ......... 369/116 |
| 2008/0024896 | A1 | * | 1/2008 | Ohta et al. ........... 360/59 |
| 2009/0225464 | A1 | * | 9/2009 | Juang et al. .......... 360/59 |
| 2010/0232050 | A1 | * | 9/2010 | Schreck et al. ....... 360/59 |
| 2011/0292773 | A1 |   | 12/2011 | Schreck et al.           |
| 2013/0229895 | A1 | * | 9/2013 | Shiroishi et al. ...... 369/13.14 |

OTHER PUBLICATIONS

Xu et al., "Dynamic Thermal Responses of Heat-Assisted Magnetic Recording Head in Data Writing Process", IEEE Transactions on Magnetics, vol. 48, No. 11, Nov. 2012, pp. 3280.
Zheng et al., "Numerical simulation of thermal flying height control sliders in heat-assisted magnetic recording", Microsyst Technol (2012) 18:1731-1739 DOI 10.1007/s00542-012-1618-6.

* cited by examiner

*Primary Examiner* — Brenda Bernardi
(74) *Attorney, Agent, or Firm* — Thomas R. Berthold

(57) ABSTRACT

A thermally-assisted recording (TAR) disk drive operates by turning on write current prior to the application of heat to the recording layer by the near-field transducer (NFT). In a TAR disk drive that uses thermal fly-height control (TFC), TFC power is at a first power level that keeps the write pole at a predetermined fly-height. The write current is then turned on, either simultaneously with or after a reduction in TFC power. The write pole then reaches its optimal fly-height as a result of the combination of write pole protrusion caused by the write current and retraction of the write pole caused by the reduction in TFC power. After the write pole has reached its optimal fly-height, heat is applied to the recording layer by the NFT. The combination of write current and heat causes writing to occur at the optimal write pole fly-height.

14 Claims, 6 Drawing Sheets

METHOD FOR CONTROLLING WRITING IN A THERMALLY-ASSISTED RECORDING (TAR) DISK DRIVE WITH THERMAL FLY-HEIGHT CONTROL

TECHNICAL FIELD

This invention relates generally to a thermally-assisted recording (TAR) disk drive, in which data are written while the magnetic recording layer on the disk is at an elevated temperature, and more specifically to a TAR disk drive with thermal fly-height control (TFC).

BACKGROUND OF THE INVENTION

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. It is known that the coercivity of the magnetic material of the recording layer on the disk is temperature dependent. Thus one proposed solution to the thermal stability problem is thermally-assisted recording (TAR), also called heat-assisted magnetic recording (HAMR), wherein high-$K_u$ magnetic recording material is heated locally during exposure to the magnetic field from the write head to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a magnetoresistive read head. TAR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed TAR disk drive uses a laser source and an optical waveguide coupled to a near-field transducer (NFT) for heating the recording material on the disk. A "near-field" transducer refers to "near-field optics", wherein the passage of light is through an element with subwavelength features and the light is coupled to a second element, such as a substrate like a magnetic recording medium, located a subwavelength distance from the first element. The NFT is typically located at the air-bearing surface (ABS) of the air-bearing slider that also supports the read/write head and rides or "files" above the disk surface.

TAR disk drives with thermal fly-height control (TFC) of the read/write head have also been proposed. The slider has a disk-facing air-bearing surface (ABS) that causes the slider to ride on a cushion or bearing of air generated by rotation of the disk. The separation or spacing between the head and the disk surface is called the fly-height. The slider is attached to a suspension and the suspension includes a load beam that applies a load force to the slider to counteract the air-bearing force while permitting the slider to "pitch" and "roll". The flying dynamics of the slider and thus the fly-height are influenced by factors such as the rotation speed of the disk, the aerodynamic shape of the slider's ABS, the load force applied to the slider by the suspension, and the pitch and roll torques applied to the slider by the suspension. TAR disk drives may use TFC for changing the spacing between the head and the disk surface. One type of TFC uses an electrically-resistive heater located on the slider near the head. When current is applied to the heater the heater expands and causes the head to expand and thus move closer to the disk surface. The head can be adjusted to different heights, depending on whether the drive is reading or writing. Also, the heater can maintain the head at the optimal fly-height even in the presence of the above-described factors which would otherwise cause changes in the fly-height.

However, even in the absence of heat to the heater, the write head expands during a write operation as a result of heat from the write coil, which results in protrusion of the write pole. Thus the fly-height of the write pole decreases roughly exponentially during a write operation. To compensate for this, the current to the heater can be decreased to increase the fly-height. However, the time for the optimal fly-height to be achieved can vary. Because the laser is on during a write operation so that the NFT can heat the recording layer, if the optimal fly-height is not achieved or cannot be maintained data errors can occur during writing.

What is needed is a method for controlling the writing in a TAR disk drive with TFC.

SUMMARY OF THE INVENTION

The invention relates to a method of writing to the recording layer in a TAR disk drive wherein the write current is turned on prior to the application of heat to the recording layer by the NFT, and thereafter the NFT heats the recording layer after the write pole has achieved its optimal fly-height. In a TAR disk drive that uses TFC, TFC power is at a first power level that keeps the write pole at a predetermined fly-height. The write current is then turned on, either simultaneously with or after a reduction in TFC power. The write pole then reaches its optimal fly-height as a result of the combination of write pole protrusion caused by the write current and retraction of the write pole caused by the reduction in TFC power. After the write pole has reached its optimal fly-height, heat is applied to the recording layer by the NFT. The combination of write current and heat causes writing to occur at the optimal write pole fly-height.

For a fuller understanding of the nature and advantages of the present invention, reference should be made to the following detailed description taken together with the accompanying figures.

BRIEF DESCRIPTION OF THE DRAWING

FIG. 7 is a timing diagram showing the method of writing to the recording layer according to the invention wherein the thermal fly-height control (TFC) power is reduced before the write (WC) is turned on.

DETAILED DESCRIPTION OF THE INVENTION

Figure 1:
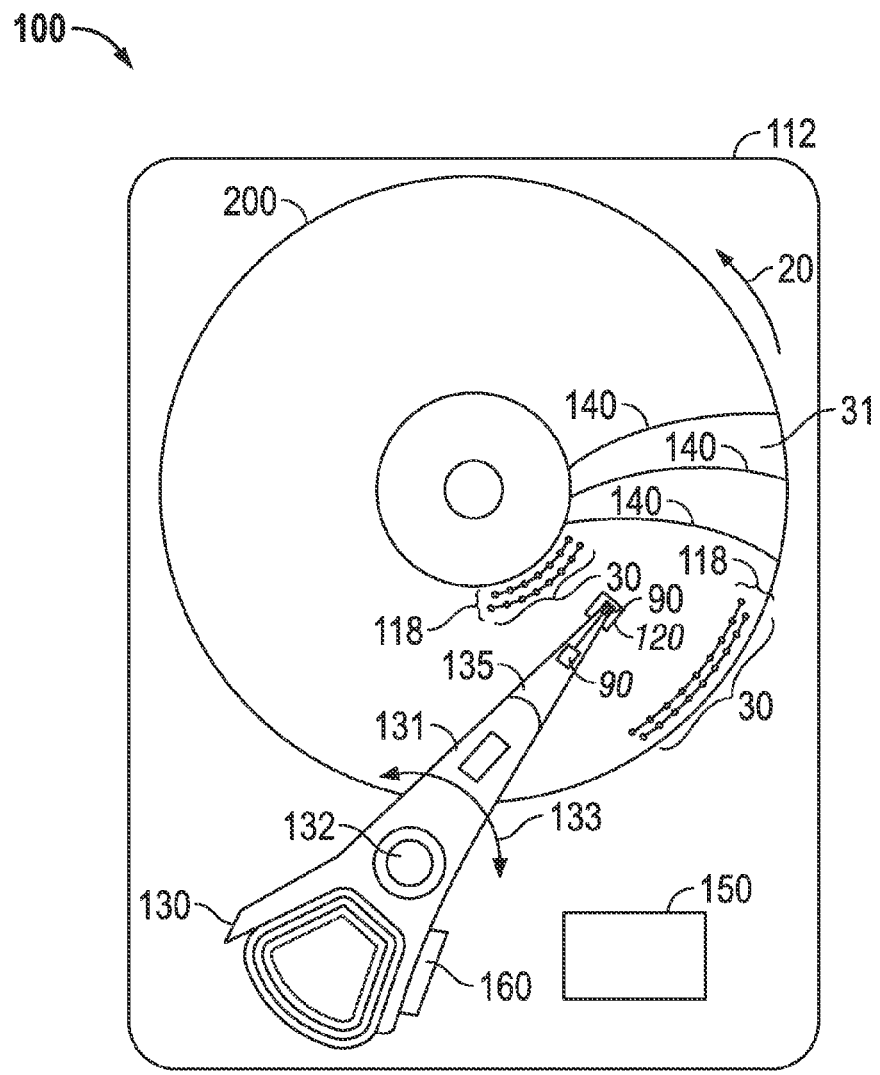
FIG. 1 is a top view of a thermally-assisted recording (TAR) disk drive according to the invention.

FIG. 1 is a top view of a thermally-assisted recording (TAR) disk drive 100 according to the invention. In FIG. 1, the TAR disk drive 100 is depicted with a disk 200 with magnetic the recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the TAR disk drive may instead use disks in which the recording layer 31 is a conventional continuous magnetic recording layer of magnetizable material. The 200 disk contains a plurality of servo sectors, three of which are shown as servo sectors 140, which are equally angularly spaced around the disk and extend across the tracks 118 in a generally radial direction.

The drive 100 has a housing or base 112 that supports an actuator 130 and a drive motor for rotating the magnetic recording disk 200. The drive 100 also includes the hard disk controller (HDC) 150 and an arm electronics (AE) module 160 mounted to the actuator 130. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the TAR head (not shown), which includes a magnetoresistive read head, an inductive write head, the near-field transducer (NFT) and optical waveguide, and the thermal fly-height control (TFC) heater. A laser diode 90 with a wavelength of 780 to 980 nm may used as the TAR light source and is depicted as being supported on the top of slider 120. Alternatively the laser may be located on suspension 135 and coupled to slider 120 by an optical channel. As the disk 200 rotates in the direction of arrow 20, the movement of actuator 130 allows the TAR head on the slider 120 to access different data tracks 118 on disk 200. The servo sectors 140 contain nondata information for positioning the TAR head to selected data tracks 118 and maintaining the head on the data tracks during reading and writing. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and TAR head associated with each surface of each disk.

Figure 2:
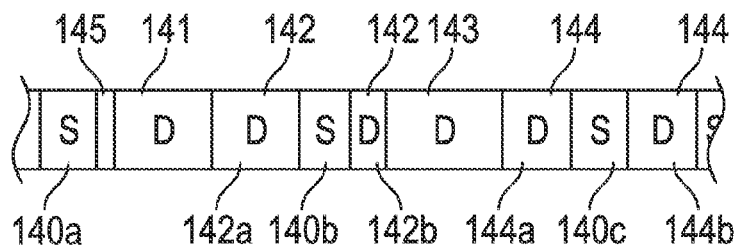
FIG. 2 is a schematic of a portion of a typical data track showing representative data sectors and servo sectors.

Referring now to FIG. 2, a portion of a typical track 118 on the disk 200 is shown expanded. Four complete data sectors are shown (141, 142, 143 and 144). Three representative servo sectors 140a, 140b, and 140c are also shown. As can be seen from this example, some data sectors are split by servo sectors, and some data sectors do not start immediately following a servo sector. For example, data sectors 142 and 144 are split by servo sectors 140b and 140c, respectively. Data sector 142 is split into data sections 142a and 142b, and data sector 144 is split into data sections 144a and 144b. Data sector 143 starts immediately after the end of data sector 142, rather than immediately following a servo sector. An index mark 145 indicates the beginning of the track and is shown contained in servo sector 140a. There are gaps (not shown) between the data sectors and servo sectors to accommodate nondata fields such as synchronization marks and sector numbers.

Figure 3:
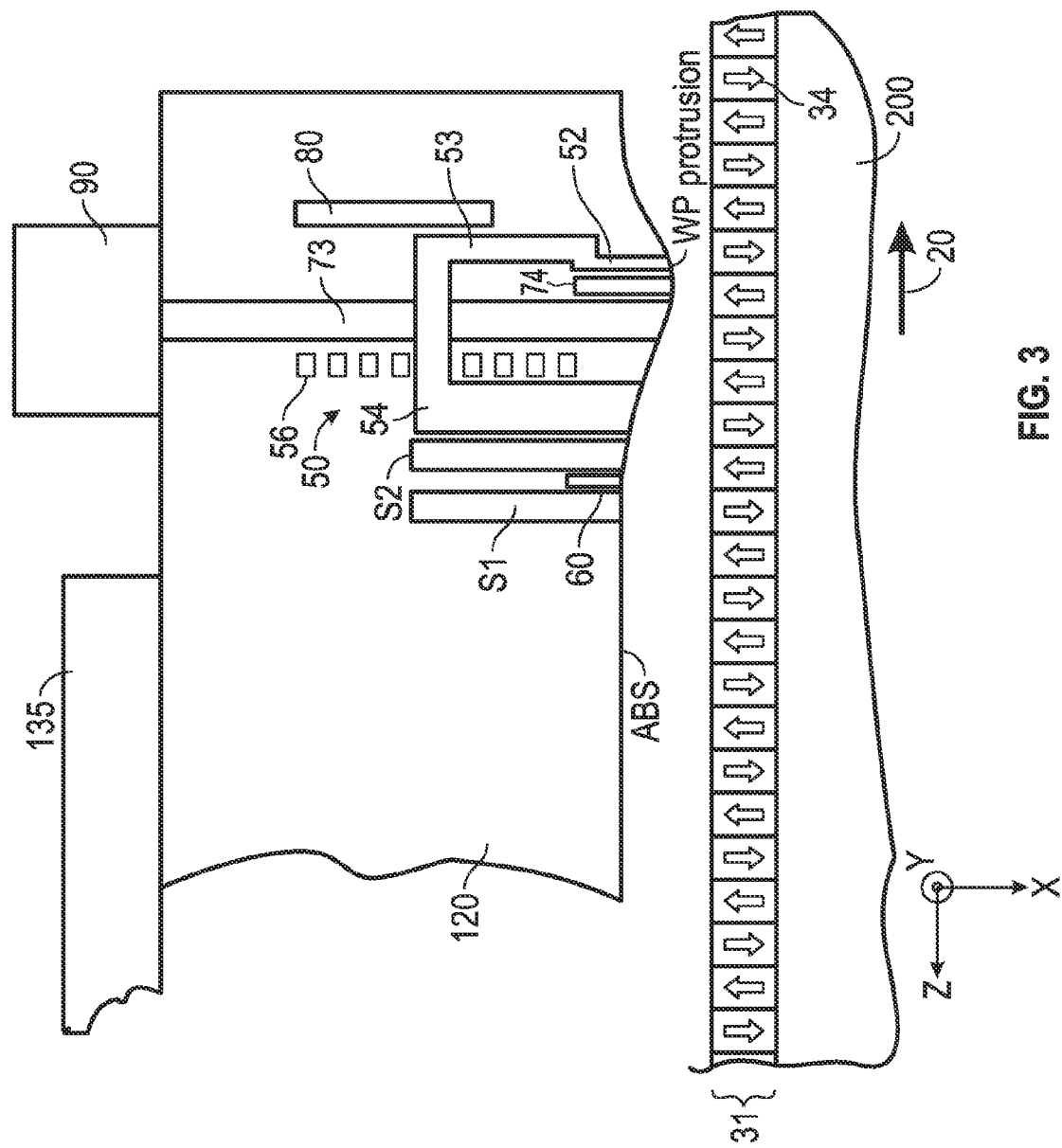
FIG. 3 is a sectional view, not to scale because of the difficulty in showing the very small features, of an air-bearing slider for use in TAR disk drive and a portion of a TAR disk according to the invention.

FIG. 3 is a cross-sectional view illustrating a configuration example of a TAR head according to the present invention. FIG. 3 is not to scale because of the difficulty in showing the very small features. In FIG. 3, the X direction denotes a direction perpendicular to the air-bearing surface (ABS) of the slider, the Y direction denotes a track width or cross-track direction, and the Z direction denotes an along-the-track direction. In FIG. 3, the disk 200 is depicted with the recording layer 31 being a conventional continuous magnetic recording layer of magnetizable material with magnetized regions or "bits" 34. The air-bearing slider 120 is supported by suspension 135 and has an ABS that faces the disk 200 and supports the magnetic write head 50, read head 60 with magnetically permeable read head shields S1 and S2, and the near-field transducer (NFT) 74. A magnetic field is generated by the write head 50 made up of a coil 56, a magnetic pole 53 for transmitting flux generated by the coil 56, a write pole 52, and a return pole 54. The magnetic field generated by the coil 56 is transmitted through the magnetic pole 53 to the write pole 52 which is located near the NFT 74. At the moment of writing, the recording layer 31 of disk 200 is heated by an optical near-field generated by the NFT 74 and, at the same time, a region or "bit" 34 is magnetized and thus written onto the recording layer 31 by applying a magnetic field generated by the write pole 52.

A semiconductor laser diode 90 is mounted to the top surface of slider 120. An optical waveguide 73 for guiding light from laser diode 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

An electrically resistive heater 80 is located on slider 120 for controlling the spacing between the write pole 52 and the recording layer 31. As the current to heater 80 increases, the heater 80 expands and causes protrusion of the write pole 52, as well as the read head 60, which moves the write pole 52 and read head 60 closer to recording layer 31 on disk 200. A thermal fly-height actuator is described in U.S. Pat. No. 5,991,113 and U.S. Pat. No. 7,095,587 B2.

U.S. Pat. No. 7,023,647 B2 describes a thermal actuator fly-height control circuit that may be implemented into the disk drive's read head pre-amplifier circuit.

Figure 4:
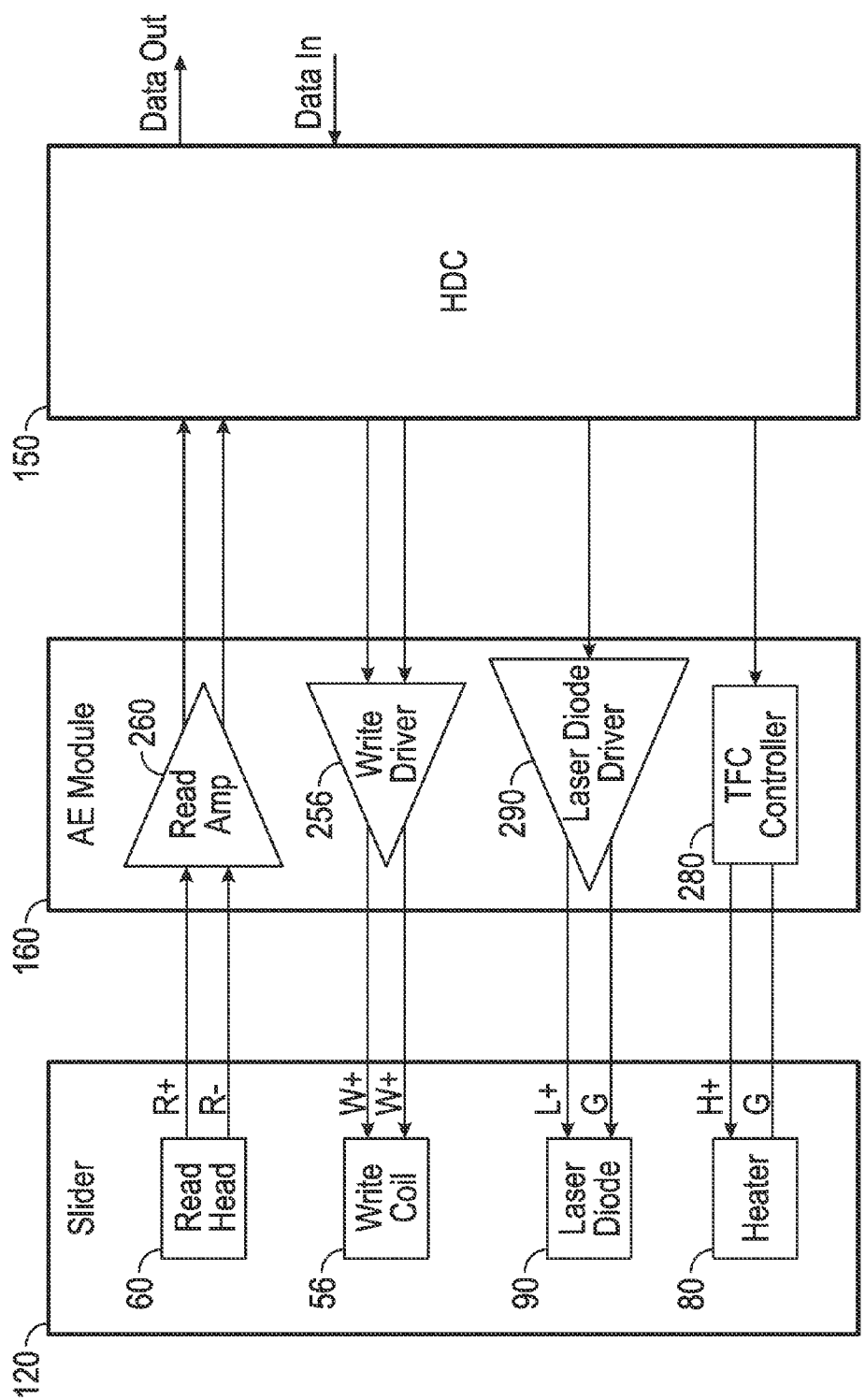
FIG. 4 is a high level block diagram showing the electrical connection between the slider, the arm electronics (AE) module and the hard disk controller (HDC).

FIG. 4 is a high level block diagram showing the electrical connection between the slider 120, the AE module 160 and the HDC 150. The connections between slider 120 and AE module 160 are via an integrated lead suspension (ILS) (not shown) along the actuator arm 131 and suspension 135 and include R+/R− connections between the read head 60 and the read amplifier 260, W+/W− connections between the write coil 56 and the write driver 256, a heater (H+) and ground (G) connections between the heater 80 and TFC driver 280, and a (L+) and ground (G) connections between the laser diode 90 and laser diode driver 290.

During operation of the disk drive, the HDC 150 sends read and write commands to AE module 160 to read or write data to and from selected data sectors in the data tracks. The TFC controller 280 includes registers which store sets of heater power values to be used during reading and writing. The laser diode driver 290 includes registers which store sets of laser diode power values to be used during writing. When the HDC 150 sends write commands to AE module 160, the TFC controller 280 registers and laser diode driver 290 registers are updated so that the correct heater power values and laser power values are used and correctly timed with the writing of data to the selected data sectors.

Figure 5:
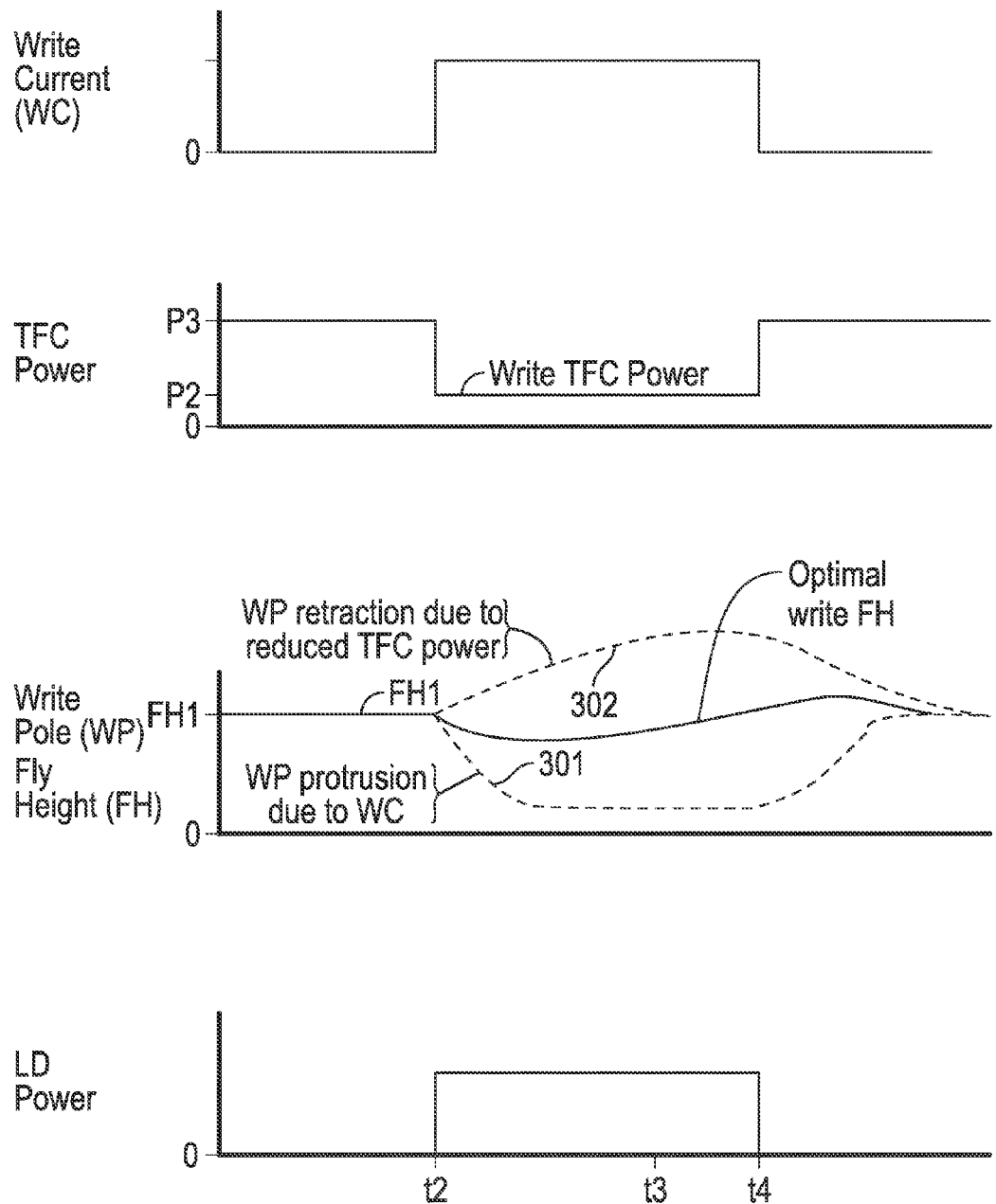
FIG. 5 is a timing diagram showing the method of writing to the recording layer according to the prior art.

FIG. 5 is a timing diagram showing the method of writing to the recording layer according to the prior art. In this example it will be assumed that one complete data sector is to be written between the time t2 and t4. Prior to t2, the TFC power is at a power level P3 which keeps the write pole (WP) at a predetermined fly-height (FH1). At time t2 the write current (WC) and the laser diode (LD) power are turned on simultaneously. The WC causes the WP to protrude and move closer to the disk. In the absence of any compensation, the WP would protrude according to line 301. However, to compensate for this the TFC power is reduced at t2 from P3 to P2. In the absence of any WC, the retraction of the WP away from the disk as a result of the reduction in TFC power would proceed according to line 302. However, the time for maximum WP protrusion occurs sooner than the time for maximum WP retraction. As a result, the optimal WP FH does not occur until time t3 after time t2. As a result the WP FH is less than the optimal FH during the time between t2 and t3 when writing is taking place. If the time for maximum WP retraction occurred sooner than the time for maximum WP protrusion, the WP FH would be greater than the optimal FH between time t2 and t2. In either case, writing at a FH other than the optimal FH can result in write errors.

Figure 6:
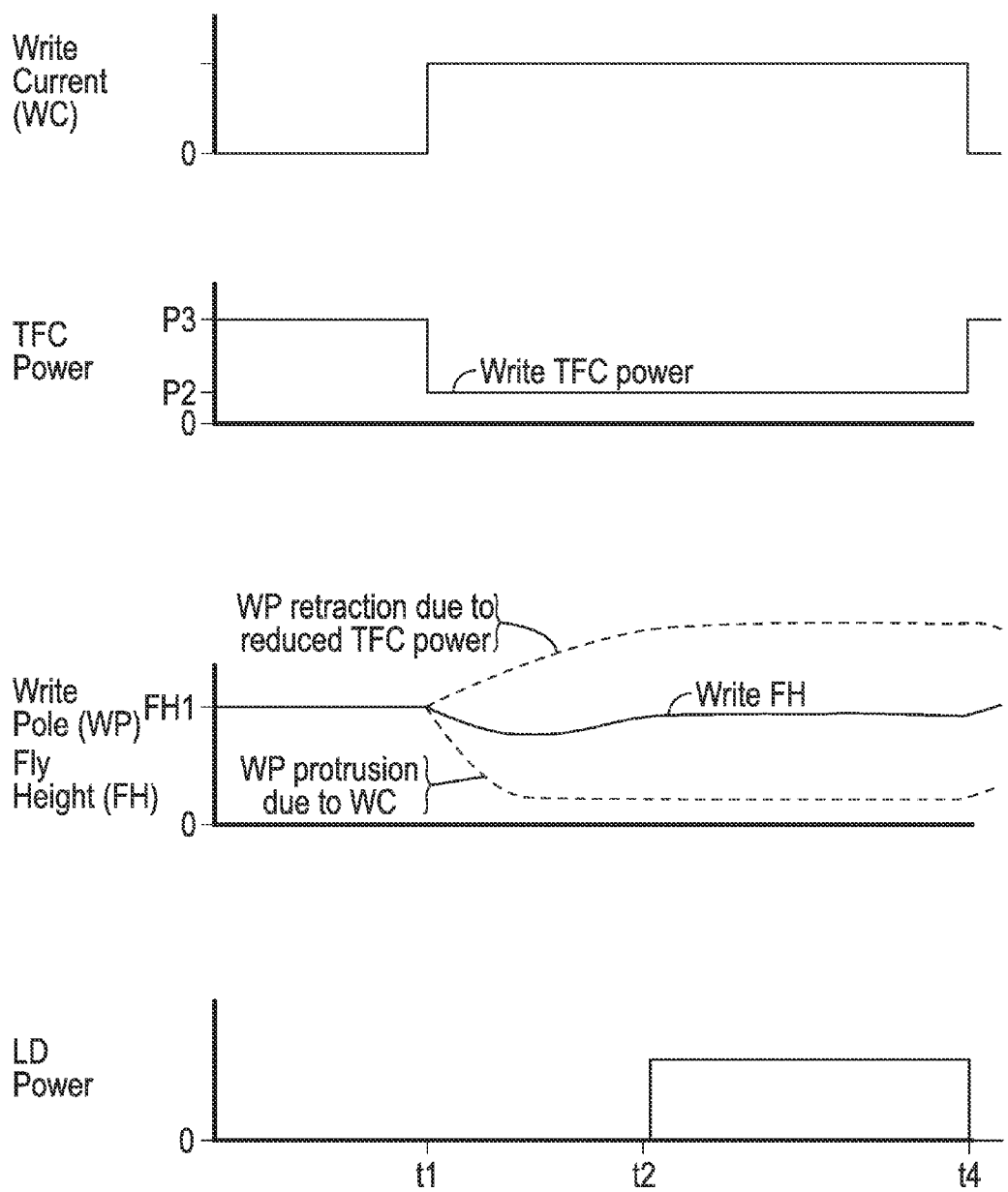
FIG. 6 is a timing diagram showing the method of writing to the recording layer according to the invention.

FIG. 6 is a timing diagram showing the method of writing to the recording layer according to the invention. Again it will be assumed that one complete data sector is to be written between the time t2 and t4. Prior to time t1, the TFC power is at a power level P3 which keeps the write pole (WP) at a predetermined fly-height (FH1). At time t1, prior to time t2, the write current (WC) is turned on simultaneously with a reduction in TFC power from P3 to P2. During the time from t1 to just before t2 the WP FH has reached the optimal FH as a result of the combination of WP protrusion and TFC heater compensation. Then at t2 the LD power is turned on. The combination of WC and LD power between t2 and t4 causes writing to occur at the optimal WP FH. Even though the WC is on prior to t2, no writing occurs on the recording layer because the NFT is not heating the disk to near or above its Curie temperature. Thus in the method of this invention the LD power is not turned on until after the WP protrusion has been fully compensated by the reduction in TFC power and the optimal WP FH has been achieved. Writing is terminated, as depicted in FIG. 6, at t4 by removing LD power and WC simultaneously. Alternatively, LD power only can be turned off at t4 and thereafter terminating WC.

Figure 7:
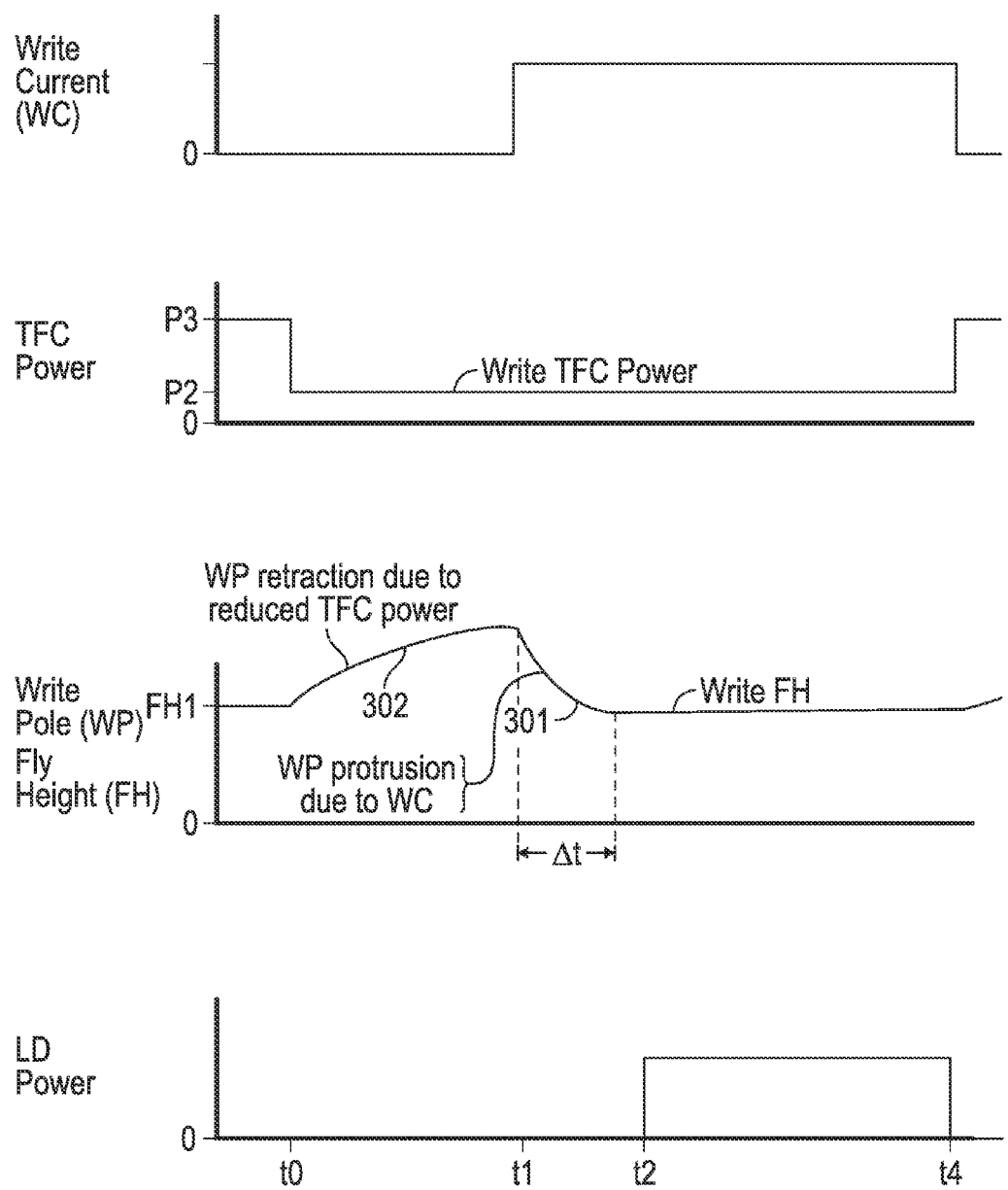

FIG. 7 is a timing diagram showing the method of writing to the recording layer according to the invention wherein the TFC power is reduced before the WC is turned on. Again it will be assumed that one complete data sector is to be written between the time t2 and t4. Prior to time t1, the TFC power is at power level P3 which keeps the write pole (WP) at a predetermined fly-height (FH1). At time t1, prior to t1, the TFC power is reduced from P3 to P2. This cause the WP to retract according to line 302 and reach an increased FH. Then at t1, prior to t2, the WC is turned. This causes the WP to protrude according to line 301. However, because the WP protrusion has already been compensated by the reduction in TFC power, the WP protrusion causes the WP to achieve the optimal FH. Then at t2 the LD power is turned on. If the time for the WP to reach its maximum protrusion after application of WC to the coil at t1 is $\Delta t$, then the LD power is applied at t2, which is a time greater than $\Delta t$ after t1. The combination of WC and LD power between t2 and t4 causes writing to occur at the optimal WP FH.

The method of this invention is based on the discovery that repeated applications of WC, without the application of heat, to a data track with previously recorded data does not overwrite the previously recorded data. In one experiment a TAR disk drive that operated with a nominal WC of 60 mA and LD optical power of 30 mW to write data on a recording layer with a coercivity of about 30 kOe had a data track with previously recorded data. The track was attempted to be overwritten by the application of only the nominal WC. After 2700 attempts, there was no degradation in the previously recorded data.

While the invention has been descried for a TAR disk drive with TFC wherein the heater compensates for WP protrusion, the method of this invention is also applicable to a TAR disk drive that does not use TFC. In such a TAR disk drive, the optimal FH is the FH achieved after the WP has reached its maximum protrusion. The WC is turned on prior to writing, and then at a predetermined time later after the WP has protruded to the optimal FH, the LD power is turned on.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for writing to a magnetic recording layer in a thermally-assisted recording (TAR) disk drive, the disk drive including a disk having a magnetic recording layer, a laser diode, and an air-bearing slider having an air-bearing surface (ABS) facing the disk, wherein the slider supports a write coil, a write pole coupled to the write coil and having a tip at the ABS, and a near-field transducer (NFT) at the ABS and coupled to the laser diode, the method comprising:
    prior to writing, applying write current to the write coil to generate a magnetic field from the write pole, the write current causing protrusion of the write pole toward the recording layer;
    after the write pole has reached its maximum protrusion, applying power to the laser diode to heat the recording layer; and
    writing to the recording layer using the pre-existing magnetic field from the write pole; and
    wherein the time for the write pole to reach its maximum protrusion after application of write current to the coil is $\Delta t$, and wherein power to the laser diode is applied at a time greater than $\Delta t$ after application of write current to the coil.

2. The method of claim 1 further comprising terminating writing by removing power to the laser diode and thereafter terminating write current to the write coil.

3. The method of claim 1 further comprising terminating writing by removing power to the laser diode and simultaneously terminating write current to the write coil.

4. The method of claim 1 wherein the slider supports an electrically resistive heater, and further comprising, prior to writing, applying power to the heater at a first power level to maintain the write pole at a predetermined fly-height above the recording layer, and thereafter applying power to the heater at a power level reduced from said first power level to cause the write pole to retract from the recording layer.

5. The method of claim 4 wherein the application of write current to the write coil and the application of power to the heater at said reduced power level occur simultaneously.

6. The method of claim 4 wherein the application of power to the heater at said reduced power level occurs prior to the application of write current to the write coil.

7. A method for writing to a magnetic recording layer in a thermally-assisted recording (TAR) disk drive, the disk drive including a disk having a magnetic recording layer, a laser diode, and an air-bearing slider having an air-bearing surface (ABS) facing the disk, wherein the slider supports a write coil, a write pole coupled to the write coil and having a tip at the ABS, an electrically resistive heater, and a near-field transducer (NFT) at the ABS and coupled to the laser diode, the method comprising:
    prior to writing, applying power to the heater at a first power level to maintain the write pole at a predetermined fly-height above the recording layer;
    prior to writing, applying write current to the write coil to generate a magnetic field from the write pole, the write current causing protrusion of the write pole toward the recording layer;
    prior to writing, applying power to the heater at a power level reduced from said first power level to cause the write pole to retract from the recording layer; and
    thereafter applying power to the laser diode to heat the recording layer and thereby enable writing to the recording layer by the pre-existing magnetic field from the write pole.

8. The method of claim 7 wherein the application of write current to the write coil and the application of power to the heater at said reduced power level occur simultaneously.

9. The method of claim 7 wherein the application of power to the heater at said reduced power level occurs prior to the application of write current to the write coil.

10. The method of claim 9 wherein the time for the write pole to reach its maximum protrusion after application of write current to the coil is $\Delta t$, and wherein power to the laser diode is applied at a time greater than $\Delta t$ after application of write current to the coil.

11. The method of claim 7 further comprising terminating writing by removing power to the laser diode and thereafter terminating write current to the write coil.

12. The method of claim 7 further comprising terminating writing by removing power to the laser diode and simultaneously terminating write current to the write coil.

13. A method for writing to a magnetic recording layer in a thermally-assisted recording (TAR) disk drive, the disk drive including a disk having a magnetic recording layer, a laser diode, and an air-bearing slider having an air-bearing surface (ABS) facing the disk, wherein the slider supports a write coil, a write pole coupled to the write coil and having a tip at the ABS, and a near-field transducer (NFT) at the ABS and coupled to the laser diode, the method comprising:
    prior to writing, applying write current to the write coil to generate a magnetic field from the write pole, the write current causing protrusion of the write pole toward the recording layer;
    after the write pole has reached its maximum protrusion, applying power to the laser diode to heat the recording layer;
    writing to the recording layer using the pre-existing magnetic field from the write pole; and
    terminating writing by removing power to the laser diode and thereafter terminating write current to the write coil.

14. A method for writing to a magnetic recording layer in a thermally-assisted recording (TAR) disk drive, the disk drive including a disk having a magnetic recording layer, a laser diode, and an air-bearing slider having an air-bearing surface (ABS) facing the disk, wherein the slider supports a write coil, a write pole coupled to the write coil and having a tip at the ABS, and a near-field transducer (NFT) at the ABS and coupled to the laser diode, the method comprising:
    prior to writing, applying write current to the write coil to generate a magnetic field from the write pole, the write current causing protrusion of the write pole toward the recording layer;
    after the write pole has reached its maximum protrusion, applying power to the laser diode to heat the recording layer;
    writing to the recording layer using the pre-existing magnetic field from the write pole; and
    terminating writing by removing power to the laser diode and simultaneously terminating write current to the write coil.

* * * * *